United States Patent [19]

Ueda et al.

[11] Patent Number: 5,496,595
[45] Date of Patent: Mar. 5, 1996

[54] METHOD FOR FORMING FILM BY PLASMA CVD

[75] Inventors: Hideyuki Ueda, Takatsuki; Kenji Kuwahara, Nara; Hiroshi Seki; Kiyosi Takahasi, both of Osaka; Masaru Odagiri, Kawanishi; Mikio Murai, Hirakata, all of Japan

[73] Assignee: Matsushita Electric Industrial Co., Ltd., Osaka, Japan

[21] Appl. No.: 325,067

[22] Filed: Oct. 19, 1994

[30] Foreign Application Priority Data

Oct. 20, 1993 [JP] Japan .................................. 5-262177

[51] Int. Cl.$^6$ .................................. H05H 1/24; G11B 5/00
[52] U.S. Cl. .................................. 427/569; 427/131; 427/574; 427/577; 427/585
[58] Field of Search .................................. 427/569, 574, 427/577, 131, 585

[56] References Cited

U.S. PATENT DOCUMENTS

| | | | |
|---|---|---|---|
| 4,551,778 | 11/1985 | Arai et al. ........................ | 360/131 |
| 4,840,844 | 6/1989 | Futamoto et al. ................. | 428/336 |
| 5,192,370 | 3/1993 | Oda et al. ........................ | 118/723 |
| 5,198,263 | 3/1993 | Stafford et al. .................. | 427/577 |
| 5,204,138 | 4/1993 | Nguyen et al. ................... | 427/578 |
| 5,275,850 | 1/1994 | Kitoh et al. ..................... | 427/577 |
| 5,283,087 | 2/1994 | Yamazaki et al. ................ | 427/577 |
| 5,302,424 | 4/1994 | Murai et al. ..................... | 427/131 |
| 5,328,737 | 7/1994 | Takahashi et al. ................ | 427/569 |

FOREIGN PATENT DOCUMENTS

| | | |
|---|---|---|
| 0265699 | 4/1988 | European Pat. Off. . |
| 4-353616 | 12/1992 | Japan . |
| 2166668 | 5/1986 | United Kingdom . |

OTHER PUBLICATIONS

Database WPI Week 9213, Derwent Publications Ltd., London, GB; AN 92–102837 & JP–A–4 049 520 (Matsushita Elec. Ind.) 18, Feb. 1992.

Database WPI Week 8152, Derwent Publications Ltd., London, GB; AN 8196094D & JP–A–56 148 732 (Matsushita Elec. Ind.) 18, Nov. 1981.

*Primary Examiner*—Stevan A. Resan
*Attorney, Agent, or Firm*—Wenderoth, Lind & Ponack

[57] ABSTRACT

A magnetic recording medium comprising a back coating layer formed on a surface reverse to a magnetic layer and a carbonaceous film which is formed on the back coating layer and contains fluorine atoms and silicon atoms and/or nitrogen atoms and in which a concentration of fluorine atoms decreases in a depth direction from a surface of the carbonaceous film, while a concentration of the silicon and/or nitrogen atoms increases in the depth direction from the surface of the carbonaceous film, which recording medium has improved running stability, durability and weatherability while electromagnetic conversion characteristics are maintained.

3 Claims, 3 Drawing Sheets

METHOD FOR FORMING FILM BY PLASMA CVD

BACKGROUND OF THE INVENTION

1. Field of the Invention

The present invention relates to a magnetic recording medium, a method for producing the same and a method for forming a film by a plasma CVD (chemical vapor deposition). In particular, the present invention relates to a magnetic recording medium which is used in an audio or video equipment, a computer, and the like, and has a back coating layer on a surface of a nonmagnetic substrate reverse to a magnetic recording layer.

2. Description of the Related Art

In these years, a magnetic recording equipment is required to have a large capacity, achieve high speed reading and writing, high picture and sound quality, and have a small size and a light weight. To satisfy such requirements, it is inevitable for a magnetic recording medium to achieve a high density recording. To this end, instead of a conventional powder coating type magnetic recording medium having a magnetic layer which comprises a binder and magnetic powder dispersed in said binder, a ferromagnetic metal thin film magnetic recording medium has been actively developed and practically used, since it has a larger residual magnetic flux density (Br) and coercive force (Hc) and a thinner magnetic layer, and is more suitable for ultra-smoothing of a magnetic layer surface than the powder coating type one.

With the increase of surface smoothness of the magnetic layer, a coefficient of friction of the magnetic recording medium increases, so that running stability and durability tend to be worsened. Then, it is proposed to provide a back coating layer having specific surface roughness on a surface of a nonmagnetic substrate reverse to the magnetic layer.

The surface roughness of the back coating layer, in particular that of the ferromagnetic metal thin film magnetic recording medium should be as small as possible to decrease a so-called back transfer, that is, shape transfer of unevenness of the back coating layer to the magnetic layer surface in a winding up step or a heat treating step, and to prevent deterioration of electromagnetic conversion characteristics.

To this end, it is proposed to decrease a particle size of a filler to be contained in the back coating layer, or to add an excessive amount of a dispersant or use a binder having a relatively large amount of a polar group such as a sulfonate in a molecule for improving dispersibility of the filler. However, these measures result in decrease of film strength of the back coating layer, so that the back coating layer tends to be scraped off or a recording tape tends to be folded during tape running.

In addition, worn debris from the back coating layer is transferred to the magnetic layer surface during tape winding and may clog a magnetic head, increase the number of drop-outs or decrease output signal level. When the magnetic recording medium is stored for a long time, it suffers from blocking, namely adhesion of the magnetic layer and the back coating layer each other.

Since the magnetic layer of the ferromagnetic metal thin film magnetic recording medium has low hardness and is easily abraded, it is proposed to form, on the magnetic layer, a diamond-like carbon film and a fluorine-containing lubricant layer having a lubricity and water-repellency, successively to improve running stability and durability.

However, since a surface state of the diamond-like carbon film is very inactive chemically, when it is stored in a high temperature high humidity atmosphere, the lubricant component migrates to the back coating layer so that an amount of the lubricant on the diamond-like carbon film is reduced, and then a still-frame life is decreased.

Japanese Patent KOKAI Publication No. 353616/1992 discloses a magnetic recording medium comprising a back coating layer on a surface of a nonmagnetic substrate reverse to a magnetic layer and a fluorine-containing hard carbon film on the back coating layer to improve wear resistance of the back coating layer and also to prevent the blocking and migration of a lubricant component from a lubricant layer to the back coating layer.

However, even by the invention of the above Japanese KOKAI, it is still difficult to provide a magnetic recording medium which is excellent both in the electromagnetic conversion characteristics and durability. There are still many problems to be solved. In the structure in which the fluorine-containing hard carbon film is formed directly on the back coating layer, while a bond energy between a fluorine atom and a carbon atom in the hard carbon film is very large, an interaction between the fluorine atom and an atom on the back coating layer surface such as a carbon atom or an oxygen atom is very weak, and therefore, the fluorine-containing hard carbon film is peeled off at an interface between the hard carbon film and the back coating layer during tape running or winding, and peeled-off particles are transferred on the magnetic layer surface to cause the significant decrease of output signal or long-time clogging of the magnetic head.

Further, when a content of the fluorine atoms in the hard carbon film is large, hardness of the carbon film decreases so that the running stability of the magnetic recording medium is deteriorated.

SUMMARY OF THE INVENTION

An object of the present invention is to provide a magnetic recording medium which is excellent in running stability, durability and weatherability while maintaining good electromagnetic conversion characteristics.

Another object of the present invention is to provide a method for producing such magnetic recording medium.

A further object of the present invention is to provide an improved method for forming a film by a plasma CVD method.

According to a first aspect of the present invention, there is provided a magnetic recording medium comprising a nonmagnetic substrate, a magnetic layer formed on one surface of said nonmagnetic substrate, a back coating layer which is formed on the other surface of said nonmagnetic substrate and comprises a binder and a filler comprising carbon black, and a carbonaceous film which is formed on said back coating layer and contains fluorine atoms and at least one kind of atoms selected from the group consisting of silicon atoms and nitrogen atoms and in which a concentration of fluorine atoms decreases in a depth direction from a surface of said carbonaceous film, while a concentration of said at least one kind of atoms increases in the depth direction from the surface of said carbonaceous film.

According to a second aspect of the present invention, there is provided a method for producing a magnetic recording medium of the present invention, comprising steps of forming a magnetic layer on one surface of a nonmagnetic substrate, forming a back coating layer on the other surface of the nonmagnetic substrate, and forming a carbonaceous film on said back coating layer by exposing a surface of said back coating layer to glow discharge plasma in a mixed gas atmosphere containing a fluorine-containing organic compound gas and at least one gas selected from the group consisting of a silicon-containing organic compound gas, a nitrogen containing organic compound gas and a silicon and nitrogen-containing organic compound gas with increasing a ratio of said fluorine-containing organic compound gas to said at least one gas.

Since a surface energy (critical surface tension $\gamma_c$) of the carbonaceous film is lowered because of the presence of a suitable amount of the fluorine atoms on its surface, so that the anti-blocking is improved and the migration of the lubricant component from the magnetic layer side to the back coating layer side is suppressed.

Since the concentration of the fluorine atom in the carbonaceous film decreases in the depth direction from the topmost layer of the carbonaceous film (towards the interface between the back coating layer and the carbonaceous film), the wear resistance on the back coating layer side can be increased without decreasing hardness of the carbonaceous film.

Further, since a concentration of the silicon and/or nitrogen atoms having good chemical affinity with atoms which are present on the surface of the back coating layer such as carbon or oxygen atoms is high near the interface between the back coating layer and the carbonaceous film, good adhesion is achieved between them.

Accordingly, the magnetic recording medium can achieve good wear resistance and low energy surface properties (water and oil repellency) while maintaining the good adhesion between the carbonaceous film and the back coating layer. Therefore, the present invention can provide a magnetic recording medium which is excellent in the running stability, durability and weatherability without deteriorating the electromagnetic conversion characteristics.

DETAILED DESCRIPTION OF THE INVENTION

The present invention will be explained in detail by making reference to the accompanying drawings.

Figure 1:
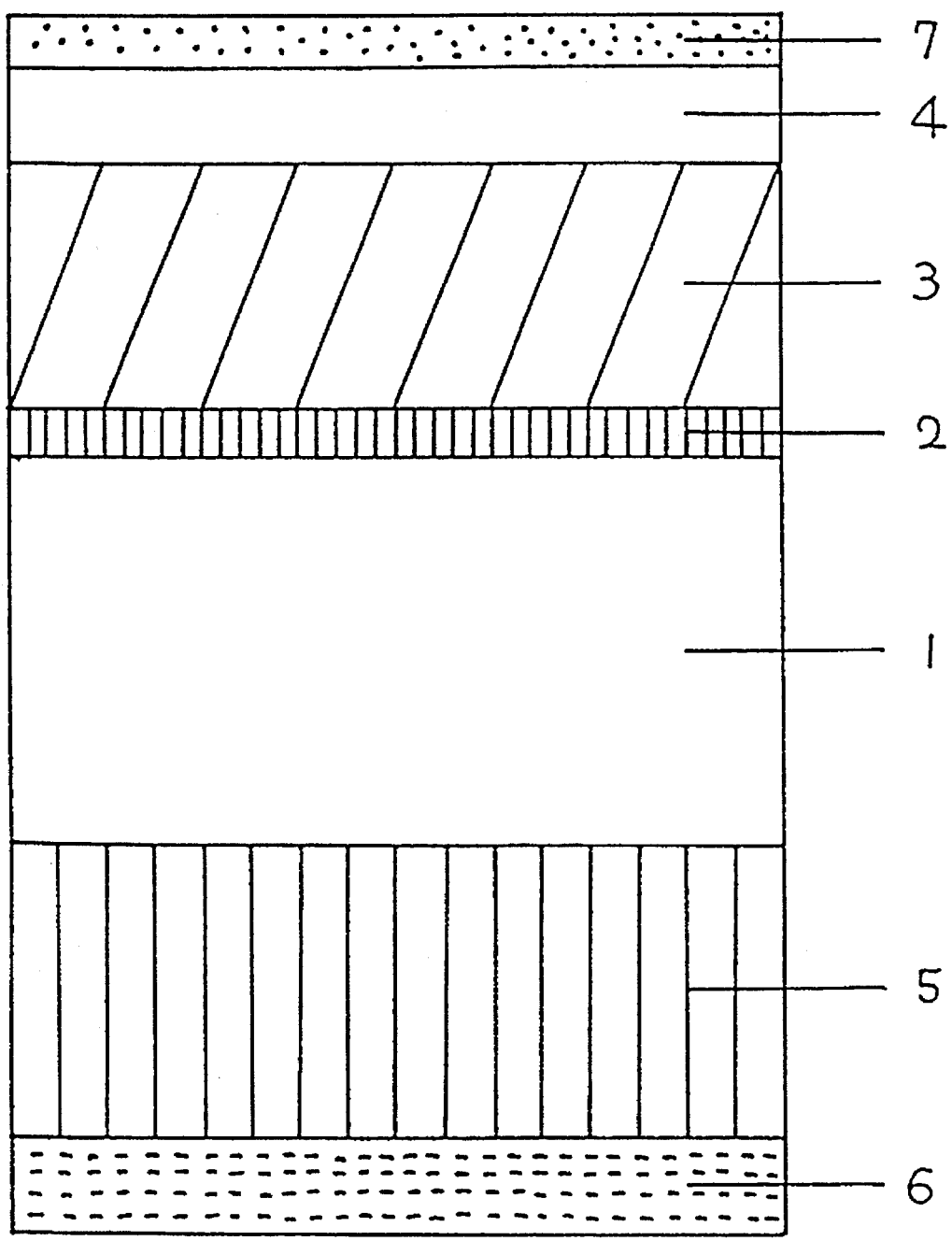
FIG. 1 is an enlarged cross sectional view of an embodiment of a ferromagnetic metal thin film magnetic tape according to the present invention, FIG. 2 schematically shows one example of an apparatus for forming a carbonaceous film constituting a ferromagnetic metal thin film magnetic tape according to the present invention by the plasma CVD method, and FIG. 3 schematically shows another example of an apparatus for forming a carbonaceous film constituting a ferromagnetic metal thin film magnetic tape according to the present invention by the plasma CVD method.

FIG. 1 shows an enlarged cross section of an example of the ferromagnetic metal thin film magnetic tape according to the present invention, which comprises a nonmagnetic substrate 1, on one surface, a ferromagnetic metal thin film 3, a diamond-like carbon film 4, a lubricant layer 7, and on the other surface, a back coating layer 5 and a carbonaceous film 6.

The nonmagnetic substrate may be made of any one of conventionally used materials, preferably, a polymer film of, for example, polyethylene terephthalate, polyethylene naphthalate, polyamide, polyimide, and so on. A thickness of the nonmagnetic substrate is not critical and can be the same as that of the conventional nonmagnetic substrate.

If desired, a minute protrusion layer 2 is formed on the surface of the nonmagnetic substrate on which the magnetic layer is formed. Preferably, the minute protrusion layer has a maximum height roughness ($R_{max}$) of 10 nm to 20 nm.

The ferromagnetic metal thin film 3 may be formed by a conventional method. For example, a ferromagnetic metal or an alloy of ferromagnetic metals such as Co, CO—Ni, etc. is heated and evaporated by, for example, an electron beam under reduced pressure in a vacuum chamber and deposited on the substrate by an oblique vapor deposition method in which an incident angle of the metal vapor is continuously changed while introducing a small amount of an oxygen gas in the vacuum chamber.

A thickness of the ferromagnetic metal film 3 is preferably from 150 to 200 nm, while it is possible to decrease or increase the thickness depending on a kind of the magnetic recording medium.

The diamond-like carbon film 4 can be formed by any one of conventional methods such as a plasma CVD method, an ion beam vapor deposition method, an ion beam sputtering method, a laser vapor deposition method, and so on.

A thickness of the diamond-like film 4 is arbitrary and preferably from 8 nm to 12 nm to maintain a reproducing signal level in a short wavelength range.

The back coating layer 5 is formed by, for example, coating a back coating paint comprising a filler (e.g. carbon black, calcium carbonate, etc.), a binder resin (e.g. polyester resin, nitrocellulose resin, etc.) and other necessary additive or additives and drying it.

A thickness of the back coating layer is not critical and preferably up to about 500 nm.

The carbonaceous film 6 contains the fluorine atoms and at least one kind of atoms selected from the group consisting of silicon atoms and nitrogen atoms. In this film 6, a concentration of the fluorine atoms decreases in the depth direction from the surface of the film 6, while a concentration of the silicon and/or nitrogen atoms increases in the depth direction from the surface of the film 6.

The concentration of the fluorine atoms may change continuously or stepwise.

A thickness of the carbonaceous film 6 is usually from 3 nm to 50 nm, preferably from 5 nm to 30 nm.

The lubricant layer 7 preferably comprises a fluorine-containing lubricant and is formed by a wet coating method or an organic vapor deposition method. Its thickness is usually up to about 3 nm.

The lubricant preferably has at least one polar group, such as —COOH, —OH, —SH, —NH$_2$, >NH, —NCO, —CONH$_2$, —CONHR, —CONR$_2$, —COOR, >PR, >PRO, —PRS, —OPO(OH)$_2$, —OPO(OR)$_2$, and —SO$_3$M in which R is a C$_1$–C$_{22}$ hydrocarbon group, and M is a hydrogen atom, an alkali metal or an alkaline earth metal.

Figure 2:
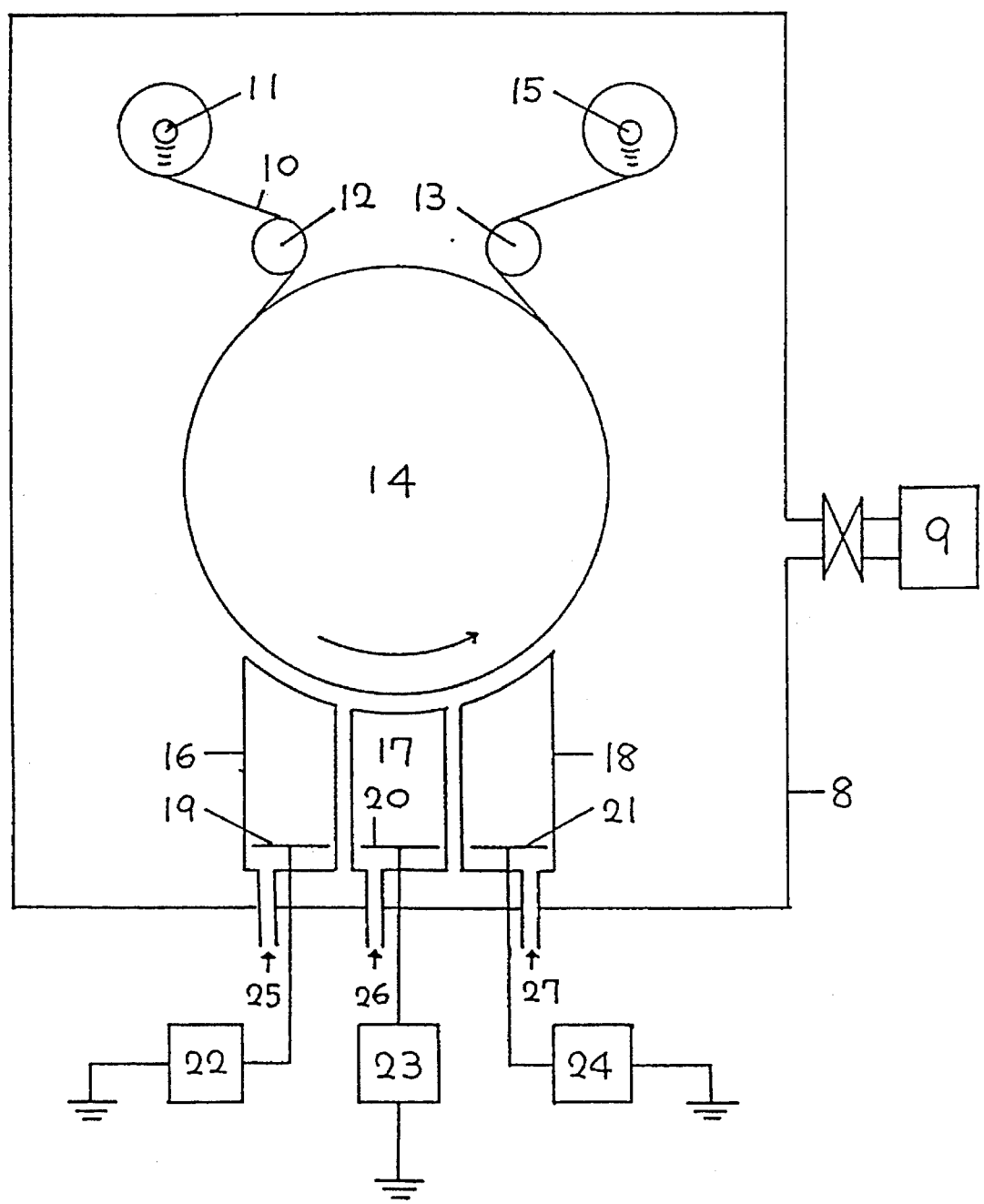

FIG. 2 schematically shows an embodiment of an apparatus for forming the carbonaceous film 6 constituting the ferromagnetic metal thin film magnetic tape according to the present invention by the plasma CVD method.

The apparatus comprises a vacuum chamber 8 which is evacuated by a vacuum pump 9 to a pressure of, for example, $10^{-4}$ torr to $10^{-5}$ torr. In the chamber 8, a sheet 10 for a magnetic recording tape which comprises the nonmagnetic substrate 1, the ferromagnetic metal thin film 3, the back coating layer 5 and the diamond-like carbon film 4 is supplied from an unwinder roll 11, passes around a pass roll 12, a cylindrical cooling can 14 and then a pass roll 13, and is taken up on a winder roll 15. The cooling can 14 functions to control a conveying rate of the sheet 10 at a constant rate.

In the vacuum chamber 8, there are three discharge tubes 16, 17 and 18 for forming the carbonaceous film 6 on the back coating layer of the sheet 10. The discharge tubes 16, 17 and 18 have pipe-form discharge electrodes 19, 20 and 21, respectively. The pipe-form discharge electrodes 19, 20 and 21 are connected to plasma-generating power sources 22, 23 and 24, respectively. As the power source, any of a system for applying a direct current or an alternating current and a system for superposing the direct current and the alternating current can be used.

The fluorine-containing organic compound gas, the silicon-containing organic compound gas, the nitrogen-containing organic compound gas, the silicon and nitrogen-containing organic compound gas, and an inert gas such as argon can be supplied in the discharging electrodes 19, 20 and 21 from gas inlets 25, 26 and 27.

Figure 3:
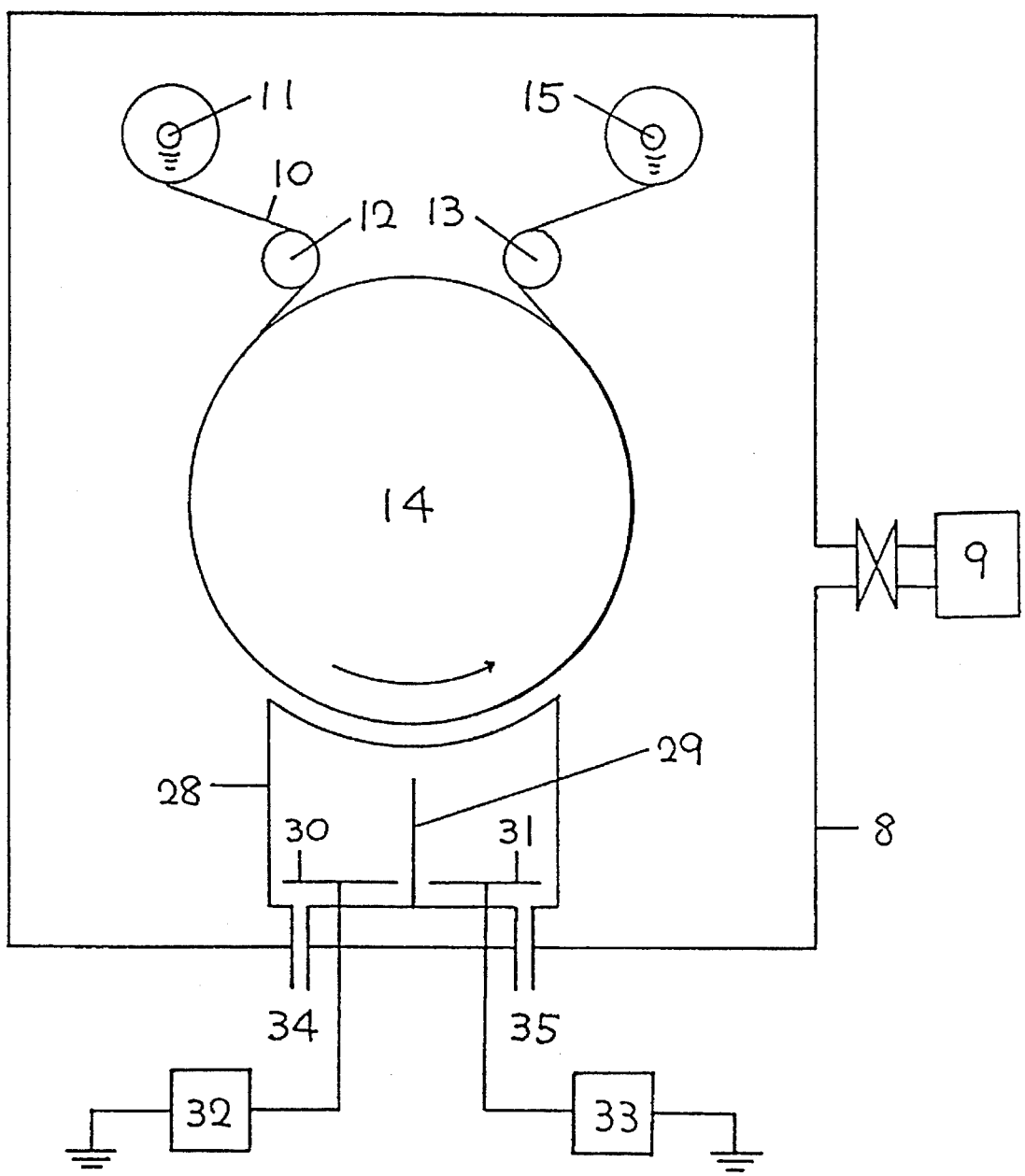

FIG. 3 schematically shows another embodiment of an apparatus for forming the carbonaceous film 6 constituting the ferromagnetic metal thin film magnetic tape according to the present invention by the plasma CVD method.

The apparatus comprises a vacuum chamber 8 which is evacuated by a vacuum pump 9 to a pressure of, for example, $10^{-4}$ torr to $10^{-5}$ torr. In the chamber 8, a sheet 10 for a magnetic recording tape which comprises the nonmagnetic substrate 1, the ferromagnetic metal thin film 3, the back coating layer 5 and the diamond-like carbon film 4 is supplied from an unwinder roll 11, passes around a pass roll 12, a cylindrical cooling can 14 and then a pass roll 13, and is taken up on a winder roll 15. The cooling can 14 functions to control a conveying rate of the sheet 10 at a constant rate.

In the vacuum chamber 8, there is a discharge tube 28 for forming the carbonaceous film 6 on the back coating layer of the sheet 10. The discharge tube 28 has a partition plate 29 and two pipe-form discharge electrodes 30 and 31. In this embodiment, a distance between the top end of the discharge tube 28 and the sheet 10 is 0.5 mm, and a distance between the top end of the partition plate 29 and the sheet 10 is 5 mm. The pipe-form discharge electrodes 30 and 31 are connected to plasma-generating power sources 32 and 33, respectively. As the power source, any of a system for applying a direct current or an alternating current and a system for superposing the direct current and the alternating current can be used.

The fluorine-containing organic compound gas, the silicon-containing organic compound gas, the nitrogen-containing organic compound gas, the silicon and nitrogen-containing organic compound gas, and an inert gas such as argon can be supplied in the discharging electrode 28 from gas inlets 34 and 35.

As the fluorine-containing organic compound, the silicon-containing organic compound, the nitrogen-containing organic compound, or the silicon and nitrogen-containing organic compound, any of conventionally used organic compounds may be used.

Preferred examples of the fluorine-containing organic compound are fluoromethane, difluoromethane, trifluoromethane, tetrafluoromethane, fluoroethylene, difluoroethylene, trifluoroethylene, tetrafluoroethylene, fluoroethane, difluoroethane, trifluoroethane, tetrafluoroethane, pentafluoroethane, hexafluoroethane, fluoropropylene, difluoropropylene, trifluoropropylene, tetrafluoropropylene, pentafluoropropylene, hexafluoropropylene, fluorobutadiene, difluorobutadiene, trifluorobutadiene, tetrafluorobutadiene, pentafluorobutadiene, hexafluorobutadiene, octafluorocyclobutane, perfluorobenzene, perfluorotoluene, and the like.

Preferred examples of the silicon-containing organic compound are trimethoxysilane, tetramethylsilane, methoxytrimethylsilane, dimethoxydimethylsilane, diethoxysilane, methyltrimethoxysilane, tetramethoxysilane, allyldimethylsilane, trimethylvinylsilane, ethyltrimethylsilane, ethyltrimethoxysilane, tetramethyldisiloxane, pentamethyldisiloxane, hexamethyldisiloxane, and the like.

Preferred examples of the nitrogen-containing organic compound are methylamine, ethylamine, propylamine, butylamine, pentylamine, vinylamine, allylamine, dimethylamine, diethylamine, trimethylamine, triethylamine, pyridine, picoline, pyridazine, pyrimidine, pyrazine, acrylamide, acrylonitrile, acetonitrile, aniline, toluidine, phenylenediamine, and the like.

Preferred examples of the silicon and nitrogen-containing organic compound are aminomethyltrimethylsilane, dimethyldimethylaminosilane, dimethylaminotrimethylsilane, tetramethyldisilazane, hexamethyldisilazane, heptamethyldisilazane, hexamethoxydisilazane, and the like.

In addition to the above organic compounds, a hydrocarbon which does not contain fluorine, silicon or nitrogen atoms such as methane, ethane, benzene, toluene and so on can be used.

PREFERRED EMBODIMENTS OF THE INVENTION

The present invention will be illustrated by the following examples, which do not limit the scope of the invention.

EXAMPLE 1

On one surface of a polyethylene terephthalate film 1 having a thickness of 10 μm which surface had a minute protrusion layer 2 having the maximum height roughness $R_{max}$ of about 15 nm measured by the surface structure analysis with a scanning tunneling microscope (STM), a ferromagnetic metal thin film 3 of Co—O having a thickness of 180 nm was formed by the continuously incident angle changing vapor deposition method.

On the ferromagnetic metal thin film 3, a diamond-like carbon film 4 having a thickness of 10 nm was formed by the plasma CVD method using a mixed gas of methane and argon in a volume ratio of 4:1.

Further, on the other surface of the polyethylene terephthalate film 1, a back coating layer 5 having a thickness of 500 nm after drying was formed by coating a mixture of carbon black, calcium carbonate, a polyester resin and nitrocellulose resin in a mixed solvent of methyl ethyl ketone, toluene and cyclohexanone (solid content of 15% by weight) by the wet coating method.

Then, the formed sheet 10 was set on the unwinder roll 11 in the vacuum chamber 8 of the apparatus of FIG. 2. After evacuating the interior of the vacuum chamber 8, tetramethyldisiloxane and argon in a volume ratio of 4:1 were introduced in the discharge tube 16 with adjusting a total gas pressure to 0.20 torr. by controlling the flow rates of the gasses. In the discharge tube 17, octafluorocyclobutane, tetrametyldisiloxane and argon in a volume ratio of 2:2:1 were introduced with adjusting a total gas pressure to 0.20 torr. by controlling the flow rates of the gasses. Further, in the discharge tube 18, octafluorocyclobutane and argon in a volume ratio of 4:1 were introduced with adjusting a total gas pressure to 0.20 torr. by controlling the flow rates of the gasses.

Thereafter, the sheet 10 was conveyed at a running rate of 15 m/min. around the can 14 while a direct current of 800 V and an alternating current of 800 V having a frequency of 20 kHz were superposed and applied to each of the discharge electrodes 19, 20 and 21 to generate nonequilibrium plasma in each of the discharge tubes 16, 17 and 18., whereby a carbonaceous film 6 having a thickness of 12 nm was formed on the surface of the back coating layer 5, in which film 6, a concentration of the fluorine atoms decreased in the depth direction from its surface towards the interface between the back coating layer and the carbonaceous film, while the concentration of the silicon atom increased in the depth direction from its surface.

Further, on the diamond-like carbon film 4, a solution of $C_5F_{11}(CH_2)_{10}COOH$ in isopropanol at a concentration of 2000 ppm was wet coated and dried to form a lubricant layer 7 having a thickness of 3 nm. Then, the sheet was slit to a width of 8 mm to obtain a 8 mm VTR tape (hereinafter referred to as "magnetic tape").

Before the formation of the lubricant layer 7, a chemical composition of the carbonaceous film 6 on the sheet 10 was analyzed by X-ray photoelectron spectroscopy (XPS) to find that an atomic ratio of the fluorine atoms to the carbon atoms near the surface of the carbonaceous film 6 was 25%. A critical surface tension $\gamma_c$ on the surface of the carbonaceous film 6 of the magnetic tape was $17.5 \times 10^{-5}$ N/cm.

EXAMPLE 2

On one surface of a polyethylene terephthalate film 1 having a thickness of 10 μm which surface had a minute protrusion layer 2 having the maximum height roughness $R_{max}$ of about 15 nm measured by the surface structure analysis with a scanning tunneling microscope (STM), a ferromagnetic metal thin film 3 of Co—O having a thickness of 180 nm was formed by the continuously incident angle changing vapor deposition method.

On the ferromagnetic metal thin film 3, a diamond-like carbon film 4 having a thickness of 10 nm was formed by the plasma CVD method using a mixed gas of methane and argon in a volume ratio of 4:1.

Further, on the other surface of the polyethylene terephthalate film 1, a back coating layer 5 having a thickness of 500 nm after drying was formed by coating the same solution as used in Example 1 by the wet coating method.

Then, the formed sheet 10 was set on the supply roll 11 in the vacuum chamber 8 of the apparatus of FIG. 3. After evacuating the interior of the vacuum chamber 8, from the inlet 34, tetrametyldisiloxane and argon in a volume ratio of 4:1 were introduced in the discharge tube 28 with adjusting a total gas pressure to 0.20 torr. by controlling the flow rates of the gasses. From the inlet 35, octafluorocyclobutane and argon in a volume ratio of 4:1 were introduced in the discharge tube 28 with adjusting a total gas pressure to 0.20 torr. by controlling the flow rates of the gasses.

Thereafter, the sheet 10 was conveyed at a running rate of 15 m/min. around the can 14 while a direct current of 800 V and an alternating current of 800 V having a frequency of 20 kHz were superposed and applied to each of the discharge electrodes 30 and 31 to generate nonequilibrium plasma in the discharge tube 28, whereby a carbonaceous film 6 having a thickness of 10 nm was formed on the surface of the back coating layer 5, in which film 6, a concentration of the fluorine atoms continuously decreased in the depth direction from its surface towards the interface between the back coating layer and the carbonaceous film, while a concentration of the silicon atom increased in the depth direction from its surface.

Further, on the diamond-like carbon film 4, a solution of $C_5F_{11}(CH_2)_{10}COOH$ in isopropanol at a concentration of 2000 ppm was wet coated and dried to form a lubricant layer 7 having a thickness of 3 nm. Then, the sheet was slit to a width of 8 mm to obtain a 8 mm VTR tape.

Before the formation of the lubricant layer 7, the chemical composition of the carbonaceous film 6 on the sheet 10 was analyzed by X-ray photoelectron spectroscopy (XPS) to find that an atomic ratio of the fluorine atoms to the carbon atoms near the surface of the carbonaceous film 6 was 23%. A critical surface tension $\gamma_c$ on the surface of the carbonaceous film 6 of the magnetic tape was $18.6 \times 10^{-5}$ N/cm.

EXAMPLE 3

In the same manner as in Example 1 except that tetramethoxysilane was used in place of tetramethyldisiloxane, hexafluoropropylene was used in place of octafluorocyclobutane and a thickness of the carbonaceous film 6 was 10 nm, a 8 mm VTR tape was produced.

Before the formation of the lubricant layer 7, the chemical composition of the carbonaceous film 6 on the sheet 10 was analyzed by X-ray photoelectron spectroscopy (XPS) to find that an atomic ratio of the fluorine atoms to the carbon atoms near the surface of the carbonaceous film 6 was 18%. A critical surface tension $\gamma_c$ on the surface of the carbonaceous film 6 of the magnetic tape was $19.8 \times 10^{-5}$ N/cm.

EXAMPLE 4

In the same manner as in Example 1 except that pyridine was used in place of tetramethyldisiloxane, a volume ratio of pyridine to argon was set at 4:1 in the discharge tube 16, the total gas pressure in the discharge tube 16 was adjusted to 0.25 torr. and a direct current of 1000 V and an alternating current of 1300 V and a frequency of 20 kHz were superposed and applied to the discharge electrode 19, and a thickness of the carbonaceous film 6 was 25 nm, a 8 mm VTR tape was produced.

Before the formation of the lubricant layer 7, the chemical composition of the carbonaceous film 6 on the sheet 10 was analyzed by X-ray photoelectron spectroscopy (XPS) to find that an atomic ratio of the fluorine atoms to the carbon atoms near the surface of the carbonaceous film 6 was 21%. A critical surface tension $\gamma_c$ on the surface of the carbonaceous film 6 of the magnetic tape was $18.1 \times 10^{-5}$ N/cm.

EXAMPLE 5

In the same manner as in Example 2 except that pyridine was used in place of tetramethyldisiloxane, pyridine and argon in a volume ratio of 4:1 were introduced in the discharge tube 28 from the inlet 34, the total gas pressure in the discharge tube 28 was adjusted to 0.25 torr. and a direct current of 1000 V and an alternating current of 1300 V having a frequency of 20 kHz were superposed and applied to the discharge electrode 30, and a thickness of the carbonaceous film 6 was 21 nm, a 8 mm VTR tape was produced.

Before the formation of the lubricant layer 7, the chemical composition of the carbonaceous film 6 on the sheet 10 was analyzed by X-ray photoelectron spectroscopy (XPS) to find that an atomic ratio of the fluorine atoms to the carbon atoms near the surface of the carbonaceous film 6 was 20%. A critical surface tension $\gamma_c$ on the surface of the carbonaceous film 6 of the magnetic tape was $18.9 \times 10^{-5}$ N/cm.

EXAMPLE 6

In the same manner as in Example 1 except that allylamine was used in place of tetramethyldisiloxane, tetrafluoroethylene was used in place of octafluorocyclobutane, to from the topmost layer of the carbonaceous film 6, a mixed gas of tetrafluoroethylene and methane was used in place of octafluorocyclobutane, a volume ratio of tetrafluoroethylene to allylamine to argon in the discharge tube 17 was changed to 1:4:1, the total pressure in the discharge tube 17 was adjusted to 0.18 torr, a volume ratio of tetrafluoroethylene to methane to argon in the discharge tube 18 was changed to 1:3:1, the total pressure in the discharge tube 18 was adjusted to 0.25 torr and a thickness of the carbonaceous film 6 was 18 nm, a 8 mm VTR tape was produced.

Before the formation of the lubricant layer 7, the chemical composition of the carbonaceous film 6 on the sheet 10 was analyzed by X-ray photoelectron spectroscopy (XPS) to find that an atomic ratio of the fluorine atoms to the carbon atoms near the surface of the carbonaceous film 6 was 13%. A critical surface tension $\gamma_c$ on the surface of the carbonaceous film 6 of the magnetic tape was $22.7 \times 10^{-5}$ N/cm.

EXAMPLE 7

In the same manner as in Example 1 except that hexamethyldisilazane was used in place of tetramethyldisiloxane, perfluorotoluene was used in place of octafluorocyclobutane, a volume ratio of perfluorotoluene to argon in the discharge tube 18 was set at 4:1, the total gas pressure in the discharge tube 18 was adjusted to 0.15 torr. and a direct current of 1000 V and an alternating current of 1300 V having a frequency of 20 kHz were superposed and applied to the discharge electrode 21, and a thickness of the carbonaceous film 6 was 15 nm, a 8 mm VTR tape was produced.

Before the formation of the lubricant layer 7, the chemical composition of the carbonaceous film 6 on the sheet 10 was analyzed by X-ray photoelectron spectroscopy (XPS) to find that an atomic ratio of the fluorine atoms to the carbon atoms near the surface of the carbonaceous film 6 was 10%. A critical surface tension $\gamma_c$ on the surface of the carbonaceous film 6 of the magnetic tape was $23.9 \times 10^{-5}$ N/cm.

EXAMPLE 8

In the same manner as in Example 1 except that hexamethoxydisilazane was used in place of tetramethyldisiloxane, perfluorotoluene was used in place of octafluorocyclobutane, to from the topmost layer of the carbonaceous film 6, a mixed gas of perfluorotoluene and toluene was used in place of octafluorocyclobutane, a volume ratio of perfluorotoluene to hexamethoxydisilazane to argon in the discharge tube 17 was changed to 1:3:1, the total pressure in the discharge tube 17 was adjusted to 0.15 torr, a direct current of 1000 V and an alternating current of 1300 V having a frequency of 20 kHz were superposed and applied to the discharge electrode 20, a volume ratio of perfluorotoluene to toluene to argon in the discharge tube 18 was changed to 1:2:1, the total pressure in the discharge tube 18 was adjusted to 0.16 torr, a direct current of 1000 V and an alternating current of 1300 V having a frequency of 20 kHz were superposed and applied to the discharge electrode 21, and a thickness of the carbonaceous film 6 was 20 nm, a 8 mm VTR tape was produced.

Before the formation of the lubricant layer 7, the chemical composition of the carbonaceous film 6 on the sheet 10 was analyzed by X-ray photoelectron spectroscopy (XPS) to find that an atomic ratio of the fluorine atoms to the carbon atoms near the surface of the carbonaceous film 6 was 7%. A critical surface tension $\gamma_c$ on the surface of the carbonaceous film 6 of the magnetic tape was $27.7 \times 10^{-5}$ N/cm.

Comparative Example 1

In the same manner as in Example 1 except that no carbonaceous film 6 was formed on the back coating layer 5, a 8 mm VTR tape was produced.

Comparative Example 2

In the same manner as in Example 1 except that methane was used in place of octafluorocyclobutane, and a thickness of the carbonaceous film 6 was 14 nm, a 8 mm VTR tape was produced.

Before the formation of the lubricant layer 7, the chemical composition of the carbonaceous film 6 on the sheet 10 was analyzed by X-ray photoelectron spectroscopy (XPS) to find that an atomic ratio of the fluorine atoms to the carbon atoms near the surface of the carbonaceous film 6 was 0%. A critical surface tension $\gamma_c$ on the surface of the carbonaceous film 6 of the magnetic tape was $35.1 \times 10^{-5}$ N/cm.

Comparative Example 3

In the same manner as in Example 1 except that allylamine was used in place of tetramethyldisiloxane, tetrafluoroethylene was used in place of octafluorocyclobutane, to from the topmost layer of the carbonaceous film 6, a mixed gas of tetrafluoroethylene and propylene was used in place of octafluorocyclobutane, a volume ratio of tetrafluoroethylene to allylamine to argon in the discharge tube 17 was changed to 1:15:4, the total pressure in the discharge tube 17 was adjusted to 0.20 torr, a volume ratio of tetrafluoroethylene to propylene to argon in the discharge tube 18 was changed to 1:19:5, the total pressure in the discharge tube 18 was adjusted to 0.25 torr, and a thickness of the carbonaceous film 6 was 20 nm, a 8 mm VTR tape was produced.

Before the formation of the lubricant layer 7, the chemical composition of the carbonaceous film 6 on the sheet 10 was analyzed by X-ray photoelectron spectroscopy (XPS) to find that an atomic ratio of the fluorine atoms to the carbon atoms near the surface of the carbonaceous film 6 was 2%. A critical surface tension $\gamma_c$ on the surface of the carbonaceous film 6 of the magnetic tape was $31.4 \times 10^{-5}$ N/cm.

Comparative Example 4

In the same manner as in Example 1 except that no tetramethyldisiloxane was used, octafluorocyclobutane and argon in a volume ratio of 4:1 were introduced in the discharge tubes 16, 17 and 18, the total pressure in each discharge tube was adjusted to 0.20 torr, and a thickness of the carbonaceous film 6 was 20 nm, a 8 mm VTR tape was produced.

Before the formation of the lubricant layer 7, the chemical composition of the carbonaceous film 6 on the sheet 10 was analyzed by X-ray photoelectron spectroscopy (XPS) to find that an atomic ratio of the fluorine atoms to the carbon atoms near the surface of the carbonaceous film 6 was 26%. A critical surface tension $\gamma_c$ on the surface of the carbonaceous film 6 of the magnetic tape was $17.4 \times 10^{-5}$ N/cm.

Comparative Example 5

In the same manner as in Example 1 except that no octafluorocyclobutane was used, tetramethyldisiloxane and argon in a volume ratio of 4:1 were introduced in the discharge tube 16, 17 and 18, the total pressure in each discharge tube was adjusted to 0.20 torr, and a thickness of the carbonaceous film 6 was 18 nm, a 8 mm VTR tape was produced.

Before the formation of the lubricant layer 7, the chemical composition of the carbonaceous film 6 on the sheet 10 was analyzed by X-ray photoelectron spectroscopy (XPS) to find that an atomic ratio of the fluorine atoms to the carbon atoms near the surface of the carbonaceous film 6 was 0%. A critical surface tension $\gamma_c$ on the surface of the carbonaceous film 6 of the magnetic tape was $39.1 \times 10^{-5}$ N/cm.

Comparative Example 6

In the same manner as in Example 1 except that octafluorocyclobutane and argon in a volume ratio of 4:1 were introduced in the discharge tube 16, the total pressure in the discharge tube 16 was adjusted to 0.20 torr, tetramethyldisiloxane and argon in a volume ratio of 4:1 were introduced in the discharge tube 18, the total pressure in the discharge tube 16 was adjusted to 0.20 torr, and a thickness of the carbonaceous film 6 was 12 nm, a 8 mm VTR tape was produced.

Before the formation of the lubricant layer 7, the chemical composition of the carbonaceous film 6 on the sheet 10 was analyzed by X-ray photoelectron spectroscopy (XPS) to find that an atomic ratio of the fluorine atoms to the carbon atoms near the surface of the carbonaceous film 6 was 0%. A critical surface tension $\gamma_c$ on the surface of the carbonaceous film 6 of the magnetic tape was $37.2 \times 10^{-5}$ N/cm.

In the Examples and Comparative Examples, the critical surface tension $\gamma_c$ on the surface of the carbonaceous film 6 of the magnetic tape was obtained by the following method:

Each of four wettability standard solutions having surface tensions of $38 \times 10^{-5}$, $45 \times 10^{-5}$, $54 \times 10^{-5}$ and $72 \times 10^{-5}$ N/cm, respectively, was dropped on the surface of the carbonaceous film and a contact angle $\theta$ of each of the solutions was measured. Then, cosines of angles $\theta$ ($\cos\theta$) were plotted against surface tensions of the wettability standard solutions (Zisman plot). A surface tension corresponding to an intersection between a line obtained by the least square method from the plot and the line at $\cos\theta=1.0$ was read and this value was defined as the critical surface tension $\gamma_c$.

With each of the VTR tapes produced in the Examples and Comparative Examples, the following properties were measured:

(1) Coefficient of friction $\mu_k$

Around a quarter of a periphery of a stainless steel (SUS 420J2) cylinder having a diameter of 4 mm and a surface roughness of 0.2 S, the tape was wound with contacting the back coating layer to the cylinder surface. Then, the tape is slid at a rate of 0.5 mm/sec. under a tension of 30 g at one end, and a tension X g at the other end is measured at a temperature of 25° C. and a humidity of 30% RH. A coefficient of friction is calculated according to the following equation:

$$\mu_k = (2/\pi) \ln (X/30)$$

A coefficient of friction obtained after 30 passes is used.

(2) Decrease of output signal

At 5° C., 80% RH, a video signal is recorded on a magnetic tape of about 60 minutes long, and reproduced in 200 passes (the running durability test). With using the RF output in the first pass as the standard (0 dB), the lowest RF output in the 200 passes is represented in the unit of "dB".

(3) Head clogging

In the above running durability test, a time at which the RF output decreases by 6 dB or larger continuously is measured, and the total time is defined as a head clogging time.

(4) Anti-blocking

At 40° C., 90% RH, a magnetic tape is stored for about 30 days, and generation of blocking is observed (o: No blocking, X: Blocked).

(5) Still-frame life

A magnetic tape which has been stored at 40° C., 90% RH for about 10 days is reproduced in a still mode at 23° C., 10% RH under a load of 20 g, and a time at which the RF output decreases by 6 dB is measured. The measurement. is terminated after 60 minutes.

The results of the above tests are shown in the Table.

TABLE

| Example No. | Coefficient of friction $\mu k$ | Decrease of output signal (dB) | Head clogging (sec/200 hr) | Anti-blocking | Still-frame life (min.) |
|---|---|---|---|---|---|
| Exam. 1 | 0.16 | −0.5 | 1 | o | >60 |
| Exam. 2 | 0.14 | 0 | 0 | o | >60 |
| Exam. 3 | 0.17 | −0.7 | 2 | o | 45 |
| Exam. 4 | 0.16 | −0.8 | 3 | o | 50 |
| Exam. 5 | 0.15 | 0 | 1 | o | >60 |
| Exam. 6 | 0.18 | −1.0 | 3 | o | 45 |
| Exam. 7 | 0.18 | −0.7 | 2 | o | 45 |
| Exam. 8 | 0.19 | −0.8 | 3 | o | 30 |
| Comp. 1 | 0.25 | −4.6 | 18 | X | 10 |
| Comp. 2 | 0.20 | −2.9 | 9 | o | 10 |
| Comp. 3 | 0.19 | −2.1 | 5 | o | 15 |
| Comp. 4 | 0.23 | −5.8 | 25 | X | 50 |
| Comp. 5 | 0.21 | −5.3 | 15 | o | 5 |
| Comp. 6 | 0.21 | −7.3 | 47 | X | 5 |

As seen from the results in the Table, the carbonaceous films produced in Examples 1 to 8 contained the fluorine atoms and the silicon and/or nitrogen atoms and the concentration of the fluorine atoms decreased in the depth direction from the surface of the carbonaceous film while the concentrations of the silicon and/or nitrogen atoms increased in the depth direction from the surface of the carbonaceous film. Since such carbonaceous film was formed on the back coating layer, the adhesion between the carbonaceous film and the back coating layer was maintained good and further the carbonaceous film could achieve sufficient wear resistance, low energy surface properties (water and oil repellency) and so on. Accordingly, the running stability, decrease of output signal and head clogging were greatly improved, and also anti-blocking and stillframe life were increased.

In particular, in Examples 2 and 5, since the concentrations of the fluorine atoms and the silicon or nitrogen atoms in the carbonaceous film changed continuously, internal stress in the carbonaceous film was relaxed and then the adhesion with the back coating layer was further increased, whereby the practical reliability such as running stability, durability and weatherability was considerably improved.

In Comparative Example 1, since the wear resistance of the back coating layer was low, the running stability of the tape was worsened. Further, the output was decreased and the magnetic head was clogged by the worn debris of the back coating layer.

Since no fluorine atom was present near the surface of the carbonaceous film in Comparative Example 2 and the content of the fluorine atom was low near the surface of the carbonaceous film in Comparative Example 3, the surface energy of the back coating layer side increased so that, when the tapes were stored in the high temperature high humidity atmosphere, the migration of the lubricant onto the carbonaceous film could not be prevented. As the results, the amount of the lubricant on the diamond-like carbon film was decreased so that the still-frame life was shortened.

In Comparative Example 4, the content of the fluorine atoms in the carbonaceous film was too large so that the hardness of the carbonaceous film decreased and the large amount of the fluorine atoms were present near the interface with the back coating layer so that the adhesion between the carbonaceous film and the back coating layer was worsened. Thereby, the output was greatly decreased, the magnetic head was clogged, and the tape was blocked.

In Comparative Examples 5 and 6, since the silicon or nitrogen atoms which have strong chemical affinity with the polar group (e.g. the carboxyl group) of the lubricant molecule were present near the surface of the carbonaceous film, a larger amount of the lubricant migrated onto the carbonaceous film, so that the stillframe life was deteriorated.

Further, in Comparative Example 6, since a large amount of the fluorine atoms were present near the interface with the back coating layer, the adhesion between the carbonaceous film and the back coating layer was decreased so that the output was greatly decreased, the magnetic head was clogged and the tape was blocked.

In the above Examples, the metal thin film 8 mm VTR tapes were produced. The present invention can be applied to other metal thin film magnetic recording media, and the particulate magnetic recording media.

The plasma CVD method which can form the carbonaceous film having a continuously changed composition according to the present invention can be employed in the formation of the plasma polymerization film or a diamond-like carbon film which is used as a protective film on a ferromagnetic metal thin film, the formation of an insulating film for a semiconductor or a liquid crystal, the formation of an amorphous silicon which is used in an photoelectric transfer device, the formation of a superconductive thin film, and so on.

What is claimed is:

1. A method for forming a film having a continuously changed composition by a plasma CVD method comprising generating glow discharge plasma on a substrate placed in a vacuum chamber using a discharge tube facing said substrate and having at least one partition plate contained within said discharge tube which partitions an interior of said discharge tube into plural sections, wherein each of said sections has a respective discharge electrode and wherein a distance between a top end of said partition plate and said substrate surface is larger than a distance between a top end of said discharge tube and said substrate surface;

wherein said method further comprises introducing raw material gases having different compositions from one another respectively into said sections and energizing each respective discharge electrode to discharge different plasma from within each respective section.

2. The method according to claim 1, wherein the distance between the top end of said partition plate and said substrate surface is at least 2 times larger than the distance between the top end of said discharge tube and said substrate surface.

3. A method for producing a magnetic recording medium comprising steps of forming a magnetic layer on one surface of a nonmagnetic substrate, forming a back coating layer on the other surface of the nonmagnetic substrate, and forming a carbonaceous film on said back coating layer by exposing a surface of said back coating layer to glow discharge plasma in a mixed gas atmosphere containing a fluorine-containing organic compound gas and at least one gas selected from the group consisting of a silicon-containing organic compound gas, a nitrogen containing organic compound gas and a silicon and nitrogen-containing organic compound gas, wherein said method further comprises varying a concentration of fluorine atoms in the carbonaceous film by increasing a ratio of said fluorine-containing organic compound gas to said at least one gas in the mixed gas atmosphere during formation of the carbonaceous film on said back coating layer.

* * * * *